(No Model.)
W. R. KILBORN.
SLED.
No. 295,409. Patented Mar. 18, 1884.
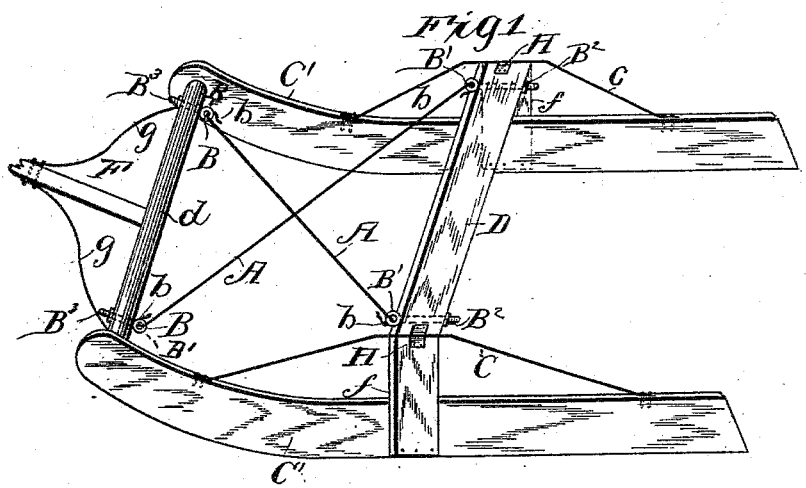
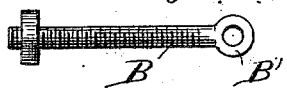
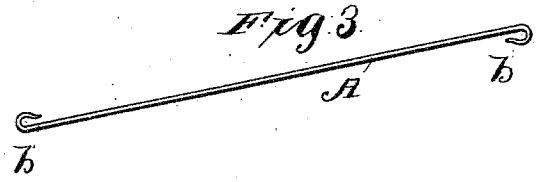
WITNESSES
W. E. Bowen
Wm M. Rheem
INVENTOR
William R Kilborn
By Myers&Co
Attorneys

UNITED STATES PATENT OFFICE.

WILLIAM R. KILBORN, OF PETOSKEY, MICHIGAN.

SLED.

SPECIFICATION forming part of Letters Patent No. 295,409, dated March 18, 1884.

Application filed January 3, 1884. (No model.)

*To all whom it may concern:*

Be it known that I, WILLIAM R. KILBORN, a citizen of the United States of America, residing at Petoskey, in the county of Emmet and State of Michigan, have invented certain new and useful Improvements in Sleds, of which the following is a specification, reference being had therein to the accompanying drawings.

My invention relates to an improvement in sleds; and it consists in the brace-rods A A, having hooks $b$ and $b$, nutted bolts B, having eyes B', platform D, platform-braces C, shaft F, having shaft-bars $g$, and in the construction, combination, and arrangement of the parts, substantially as hereinafter more fully shown and described.

In the drawings, Figure 1 is a view in perspective, and Figs. 2 and 3 are detail views thereof.

In the accompanying drawings, A A represent two corresponding metallic brace-rods, each provided at either end with a hook, $b$. These rods hook in front in eyes B' of nutted bolts B, rigidly secured to sled A, and, crossing, their rear ends are, in like manner, secured in eyes B' of nutted bolts B. The eye-bolts B (see Fig. 2) project through apertures in the front cross-bar, $d$, and corresponding eyebolts, B, through apertures in the platform-bar D. The bolts B are nutted at $B^2$ and $B^3$ for tightening the brace-bars. The platform-bar D is supported by the standards $f$ and rigidly secured in position by the metallic platform-braces C. The braces C are conformed at their ends to the same plane as the top of the runners C', to which they are bolted, and then inclined upwardly, and are conformed to and rest upon the top of platform D, to which they are secured by metallic straps or staples H. The shaft F is mortised in the cross-bar H. The shaft F is mortised in the cross-bar $d$, and it is rigidly secured in position by the shaft-securing bars $g$, which bars are each bolted to the shaft on opposite sides thereof, and to the cross-bar $d$, their cross-bar ends being turned up and provided with eyes for reception of suitable bolts.

Having described my invention, what I claim is—

1. A sled consisting of the brace-rods A, having hooks $b$, nutted bolts B, having eyes B', braces C, secured in straps or staples H, runners C', platform D, and shaft F, mortised in cross-bar $d$, and secured by bolts B, having eyes B', substantially as shown, and for the purpose described.

2. The combination of the brace-rods A, having hooks $b$, bolts B, having eyes B', braces C, secured in straps or staples H, platform D, and cross-bar $d$, substantially as shown, and for the purpose described.

3. In a sled, the combination of the shaft F, brace-bars $g$, cross-bar $d$, bolts B, having eyes B', brace-rods A, braces C, secured in straps or staples H, platform D, and runners C', substantially as shown, and for the purpose described.

In testimony whereof I affix my signature in presence of two witnesses.

WILLIAM R. KILBORN.

Witnesses:
C. J. PAILTHORP,
A. H. WINSLOW.